US012754015B2

(12) United States Patent
Zhang et al.

(10) Patent No.: US 12,754,015 B2
(45) Date of Patent: Oct. 6, 2026

(54) METHOD FOR MEASURING ORTHOGONALITY OF ORTHOGONAL AXIS SYSTEM

(71) Applicant: CHOTEST TECHNOLOGY INC., Shenzhen (CN)

(72) Inventors: Zhiwei Zhang, Shenzhen (CN); Yuan Chen, Shenzhen (CN); Hejun Zhang, Shenzhen (CN); Furong Feng, Shenzhen (CN); Xuewen Liao, Shenzhen (CN); Longjun Cheng, Shenzhen (CN)

(73) Assignee: CHOTEST TECHNOLOGY INC., Shenzhen (CN)

( * ) Notice: Subject to any disclaimer, the term of this patent is extended or adjusted under 35 U.S.C. 154(b) by 468 days.

(21) Appl. No.: 18/548,682

(22) PCT Filed: Dec. 22, 2021

(86) PCT No.: PCT/CN2021/140503
§ 371 (c)(1),
(2) Date: Sep. 1, 2023

(87) PCT Pub. No.: WO2023/005122
PCT Pub. Date: Feb. 2, 2023

(65) Prior Publication Data

US 2024/0159528 A1 May 16, 2024

(30) Foreign Application Priority Data

Jul. 29, 2021 (CN) ......................... 202110864479.3

(51) Int. Cl.
*G01B 21/22* (2006.01)
*G01B 21/04* (2006.01)

(52) U.S. Cl.
CPC ............. *G01B 21/22* (2013.01); *G01B 21/04* (2013.01)

(58) Field of Classification Search
CPC ........ G01B 5/008; G01B 21/22; G01B 5/245; G01B 21/04; G01B 21/24; G01B 5/24; G01B 21/10
See application file for complete search history.

(56) References Cited

FOREIGN PATENT DOCUMENTS

CN 101922923 A 12/2010
CN 102384732 A 3/2012
(Continued)

OTHER PUBLICATIONS

Machine Translation and Original Document of Song CN 106705821A (Year: 2017).*

(Continued)

*Primary Examiner* — Stephen D Meier
*Assistant Examiner* — Quang X Nguyen
(74) *Attorney, Agent, or Firm* — AVEK IP, LLC

(57) ABSTRACT

Some embodiments of the disclosure provide a method for measuring orthogonality of an orthogonal axis system, In some examples, the method includes following steps: placing an instrument on a bearing surface, intercepting a second rotary axis along an interception plane to obtain a first virtual cross section of the second rotary axis, and measuring the first virtual cross section to obtain a geometric center of the first virtual cross section as a first position; rotating a first rotary device to enable the second rotary axis to rotate with a preset angular degree, and measuring the second virtual cross section to obtain a geometric center of the second virtual cross section as a second position; and determining whether the orthogonality between the first rotary axis and the second rotary axis meets requirements or not on the basis of the first position and the second position.

10 Claims, 9 Drawing Sheets

(56) References Cited

FOREIGN PATENT DOCUMENTS

| | | | |
|---|---|---|---|
| CN | 105127735 | A | 12/2015 |
| CN | 106705821 | A | 5/2017 |
| CN | 109443332 | A | 3/2019 |
| CN | 113670238 | A | 11/2021 |
| JP | 2007232654 | A | 9/2007 |

OTHER PUBLICATIONS

International Search Report for PCT/CN2021/140503 issued by CNIPA (China National Intellectual Property Administration) on Apr. 28, 2022.

* cited by examiner

METHOD FOR MEASURING ORTHOGONALITY OF ORTHOGONAL AXIS SYSTEM

CROSS REFERENCE TO RELATED APPLICATIONS

This application is the United State national stage entry under 37 U.S.C. 371 of PCT/CN2021/140503, filed on Dec. 22, 2021, which claims priority to Chinese application number 202110864479.3, filed on Jul. 29, 2021, the disclosure of which are incorporated by reference herein in their entireties.

FIELD OF THE DISCLOSURE

The disclosure relates generally to the field of precision industry and engineering measurement. More specifically, the disclosure relates to methods for measuring orthogonality of orthogonal axis systems.

BACKGROUND

In the field of precision industry and measurement, it is often necessary to use a precision instrument to test objects to be assembled when a large machine is assembled, to improve the accuracy of assembly, moreover, after the machine is assembled, it is also necessary to calibrate the machine. In the process of assembling, besides measuring the three-dimensional coordinates of a target object or a target point on the object, it is also necessary to measure the movement of the target object or the target point, that is, to measure the their postures; therefore, an instrument capable of measuring six degrees of freedom based on three-dimensional coordinates is needed. As a result, a measurement method for measuring the postures of the target objects or the target points by means of a coordinate measuring instrument was developed. The accuracy of the coordinate measuring instrument mainly depends on its measurement accuracy of angles and distances. In order to improve the accuracy of the coordinate measuring instrument, it is necessary to ensure the orthogonality of an orthogonal axis system (including at least a horizontal axis and a pitching axis) in the coordinate measuring instrument. Therefore, the accuracy of the method for measuring the orthogonality of the orthogonal axis system of the coordinate measuring instrument is critical.

Patent Publication No. CN106705821A discloses a method and device for measuring the orthogonality of a rotary axis system, and in the device, two standard spheres are mounted respectively at two ends of a pitching rotary axis, and the orthogonality of the axis system is determined by adjusting the centers of the standard spheres to be coaxial with the axial line of the pitching rotary axis and then measuring the lowest or highest position of the two standard spheres in an identical direction. However, although two orthogonality measurement results of the axis system can be obtained using such a method and device for measuring the orthogonality of a rotary axis system, errors are inevitable to be brought in the process of adjusting the centers of two standard spheres to be coaxial with the axial line of the pitching axis. Additionally, error is also brought in the measurement of the lowest or highest position of the two standard spheres. The introduction of these two kinds of errors have a great impact on the accuracy of measuring the orthogonality of the axial system.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the present disclosure provides a method for measuring the orthogonality of an orthogonal axis system, which is a method for measuring the orthogonality of an orthogonal axis system of an instrument. The instrument includes a first rotary device having a first rotary axis and a second rotary device provided on the first rotary device and having a second rotary axis, the second rotary device is rotatable around the first rotary device, and the orthogonal axis system is formed by the first rotary axis and the second rotary axis. The method includes: placing the instrument on a bearing surface, flatness of the bearing surface being less than a first preset threshold; making perpendicularity between the first rotary axis and the bearing surface to be smaller than a second preset threshold value; intercepting the second rotary axis along an interception plane to obtain a first virtual cross section of the second rotary axis, the interception plane passing through a specific point of the bearing surface and being orthogonal to the bearing surface and a projection of the second rotary axis on the bearing surface, and measuring the first virtual cross section to obtain a geometric center of the first virtual cross section as a first position; rotating the second rotary device to enable the second rotary axis to rotate with a preset angular degree, the preset angular degree being an odd multiple of 180°, using the interception plane to intercept the second rotary axis to obtain a second virtual cross section of the second rotary axis, and measuring the second virtual cross section to obtain a geometric center of the second virtual cross section as a second position; and determining whether the orthogonality between the first rotary axis and the second rotary axis meets requirements based on the first position and the second position. In this case, spatial coordinates of a plurality of first measurement points and a plurality of second measurement points are measured, the determination errors in the spatial coordinates of the geometric center (i.e., the first position) of the first virtual cross section and the spatial coordinates of the geometric center (i.e., the second position) of the second virtual cross section may be effectively reduced, thereby improving the accuracy of measuring the orthogonality of the orthogonal axis system and further improving the measurement accuracy of the instrument.

Optionally, the first position is obtained by measuring spatial coordinates of a plurality of first measurement points located at an edge of the first virtual cross section and based on the spatial coordinates of the plurality of first measurement points; the second position is obtained by measuring spatial coordinates of a plurality of second measurement points located at an edge of the second virtual cross section and based on the spatial coordinates of the plurality of second measurement points. In this case, the spatial coordinates of the geometric center (i.e., the first position) of the first virtual cross section may be calculated through the plurality of first measurement points, and the spatial coordinates of the geometric center (i.e., the second position) of the second virtual cross section may be calculated through the plurality of second measurement points.

Optionally, the plurality of first measurement points are located at the outer periphery of the first virtual cross section, and the plurality of second measurement points are located at the outer periphery of the second virtual cross section; the number of the first measurement points is not less than 5, and the number of the second measurement points is not less than 5. Thereby, sufficient first measurement points may be obtained for acquiring the spatial coordinates of the geometric center of the first virtual cross section, and sufficient second measurement points may be obtained for acquiring the spatial coordinates of the geometric center of the second virtual cross section, and it is able to reduce the determination errors in these abovementioned spatial coordinates.

Optionally, a distance between the first position and the second position is set as a first distance, and whether the orthogonality between the first rotary axis and the second rotary axis meets requirements is determined based on the first distance. Thereby, whether the orthogonality of the orthogonal axis system of the instrument meets requirements may be determined based on the first distance.

Optionally, if the first distance is less than a preset value, it is determined that the orthogonality between the first rotary axis and the second rotary axis meets requirements, and if the first distance is not less than the preset value, it is determined that the orthogonality between the first rotary axis and the second rotary axis does not meet requirements, the preset value is related to the specific point. Thereby, whether the orthogonality of the orthogonal axis system of the instrument meets requirements may be determined based on the first distance and the preset value.

Optionally, spatial coordinates of an arbitrary point on an axial line of the first rotary axis are obtained as a third position, a distance between the first position and the second position is set as a first distance, a distance from the third position to the interception plane is set as a second distance, and a mismatch angle is obtained based on the first distance and the second distance; if the mismatch angle is less than a preset angle, it is determined that the orthogonality between the first rotary axis and the second rotary axis meets requirements, and if the mismatch angle is not less than the preset angle, it is determined that the orthogonality between the first rotary axis and the second rotary axis does not meet requirements. Thereby, the mismatch angle between the first rotary axis and the second rotary axis may be obtained based on a trigonometric relationship.

Optionally, the first virtual cross section and the second virtual cross section are both elliptical, or the first virtual cross section and the second virtual cross section are both circular. Thus, a cross-sectional view of the first virtual cross section and the second virtual cross section may be obtained.

Optionally, a radial circular run-out of the second rotary axis is measured before obtaining the first virtual cross section. In this case, the accuracy of machining the second rotary axis may be enabled to be higher, capable of reducing the determination errors in the follow-up acquisition of the spatial coordinates of the geometric center of the first virtual cross section and the spatial coordinates of the geometric center of the second virtual cross section.

Optionally, if the radial circular run-out is greater than a third preset threshold value, then the second rotary axis is machined to enable the radial circular run-out of the second rotary axis to be not greater than the third preset threshold value. Thereby, the good cylindricity of the second rotary axis may be ensured.

Optionally, the specific point is located within the projection. Thereby, a first end and a second end of the second rotary axis may be intercepted by the interception plane.

BRIEF DESCRIPTION OF THE DRAWINGS

Illustrative embodiments of the present disclosure are described in detail below with reference to the attached drawing FIGURES.

DETAILED DESCRIPTION

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

In some embodiments, the disclosure relates to a method for measuring the orthogonality of an orthogonal axis system, which is a method for measuring the orthogonality of an orthogonal axis system of an instrument, and hereinafter sometimes referred to simply as a measuring method. In the present disclosure, the instrument may be a measuring instrument such as a coordinate measuring instrument, but the method according to the present disclosure may also be adapted to other instruments including an orthogonal axis system. The method in this embodiment may improve the accuracy of measuring the orthogonality of the orthogonal axis system.

Figure 1:
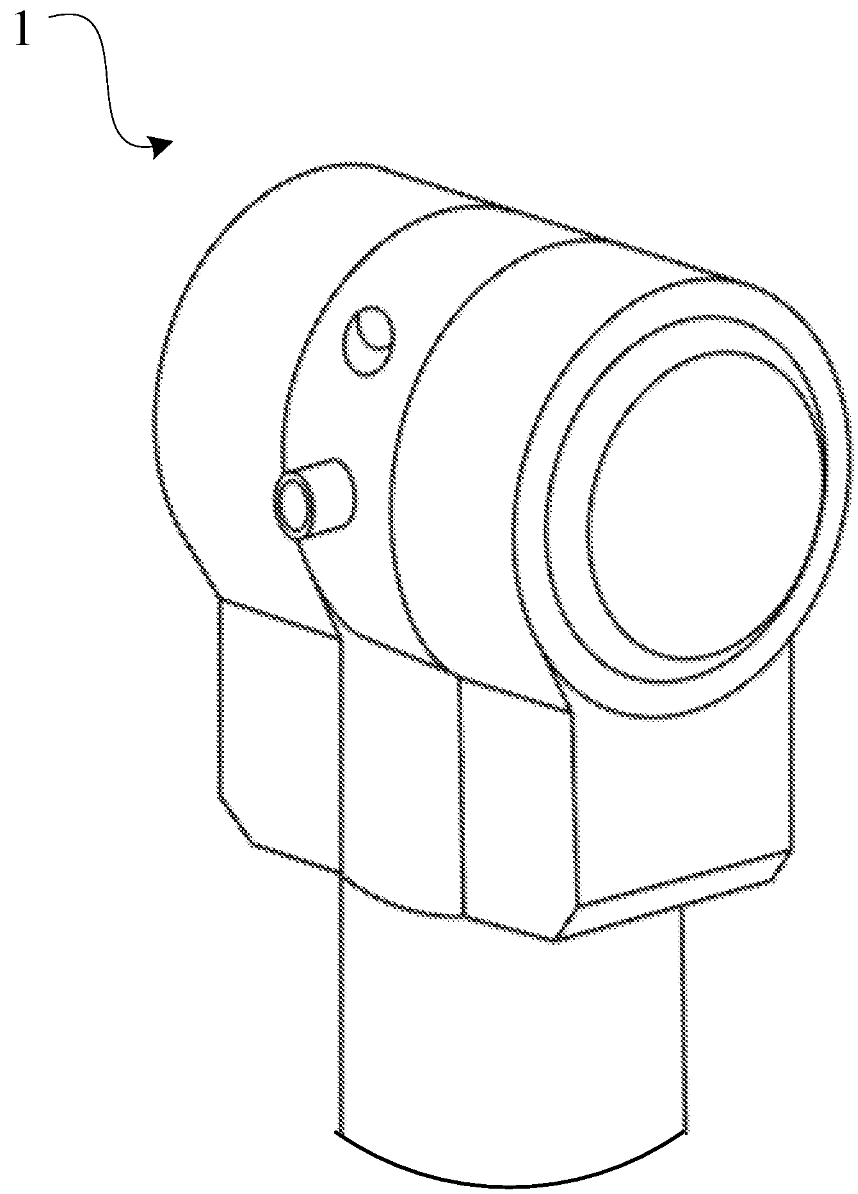
FIG. 1 shows a coordinate measuring instrument according to an embodiment of the disclosure.
Figure 2:
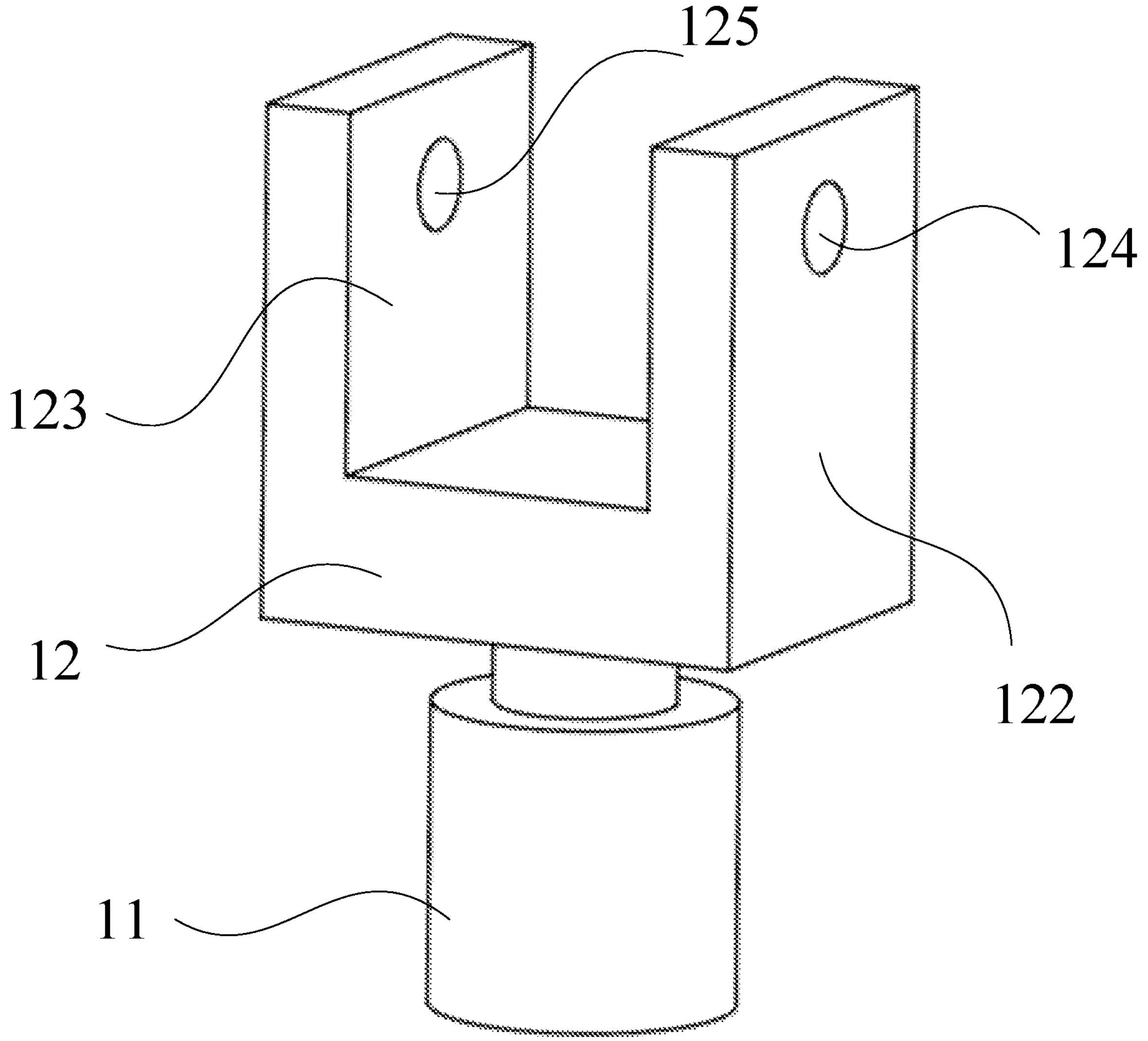
FIG. 2 shows an orthogonal axis system without mounting a second rotary axis according to an embodiment of the disclosure.
Figure 3:
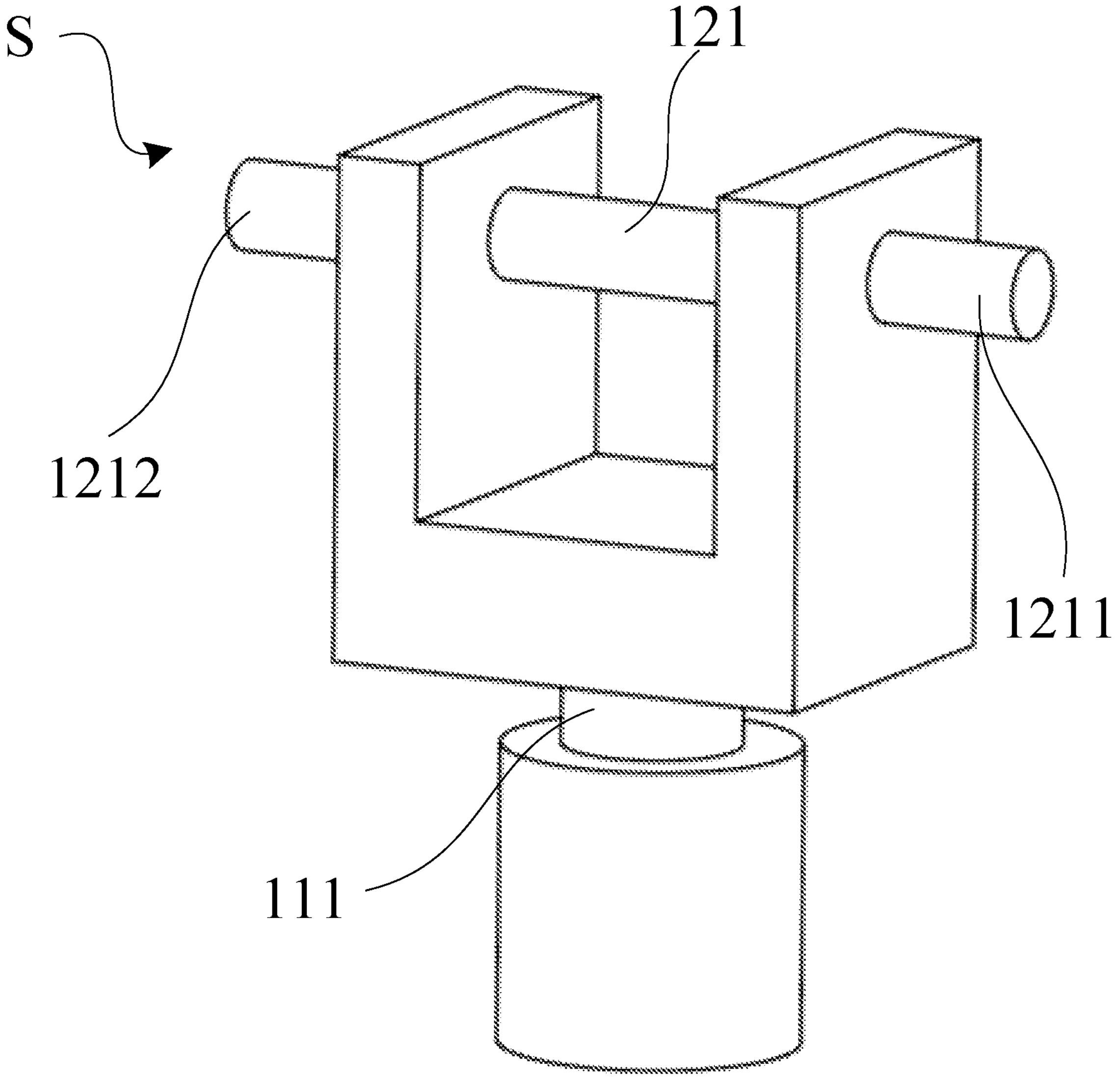
FIG. 3 shows the orthogonal axis system according to an embodiment of the disclosure.
Figure 4:
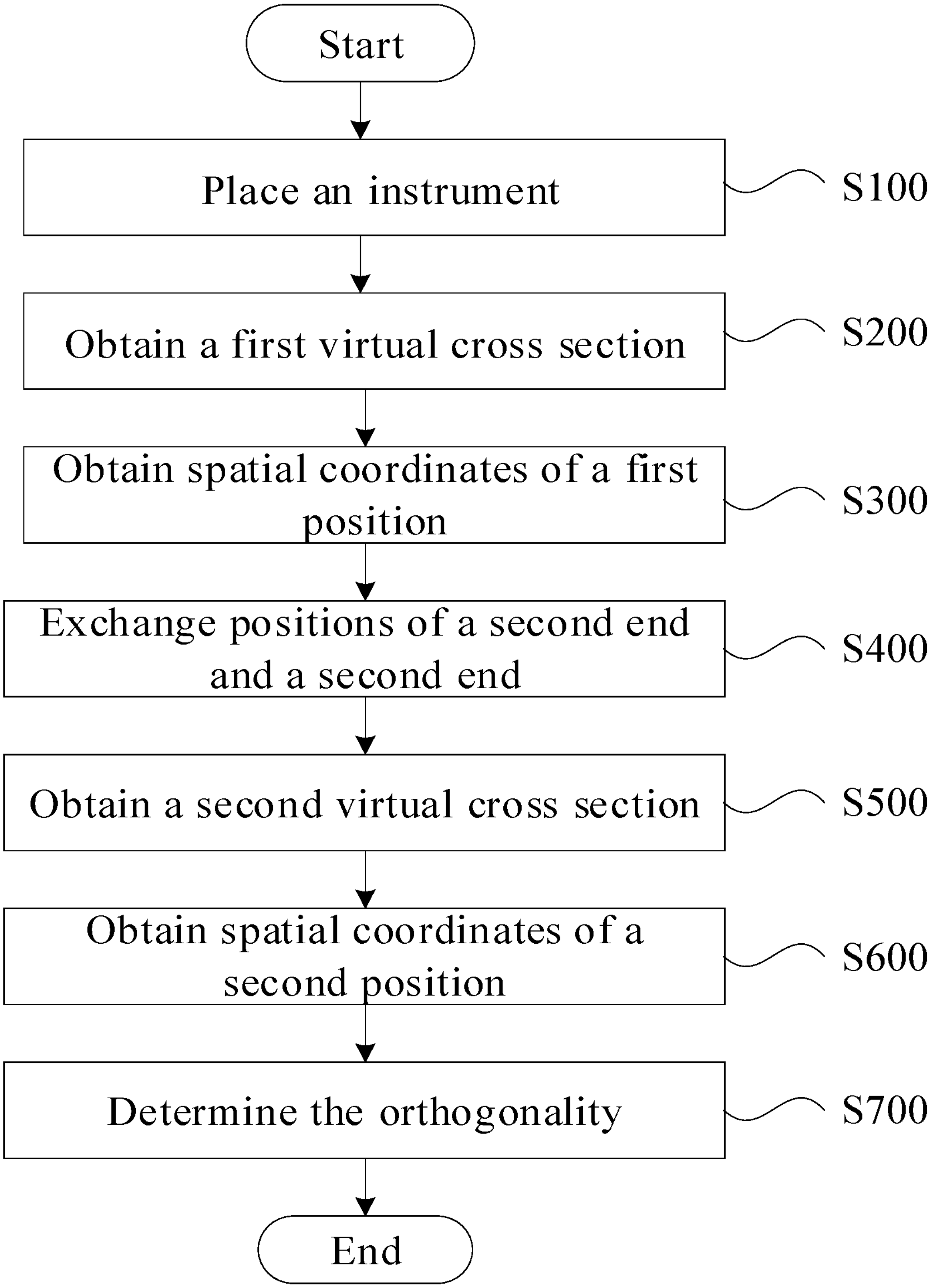
FIG. 4 is a flowchart showing a method for measuring the orthogonality of the orthogonal axis system according to an embodiment of the disclosure.
Figure 5:
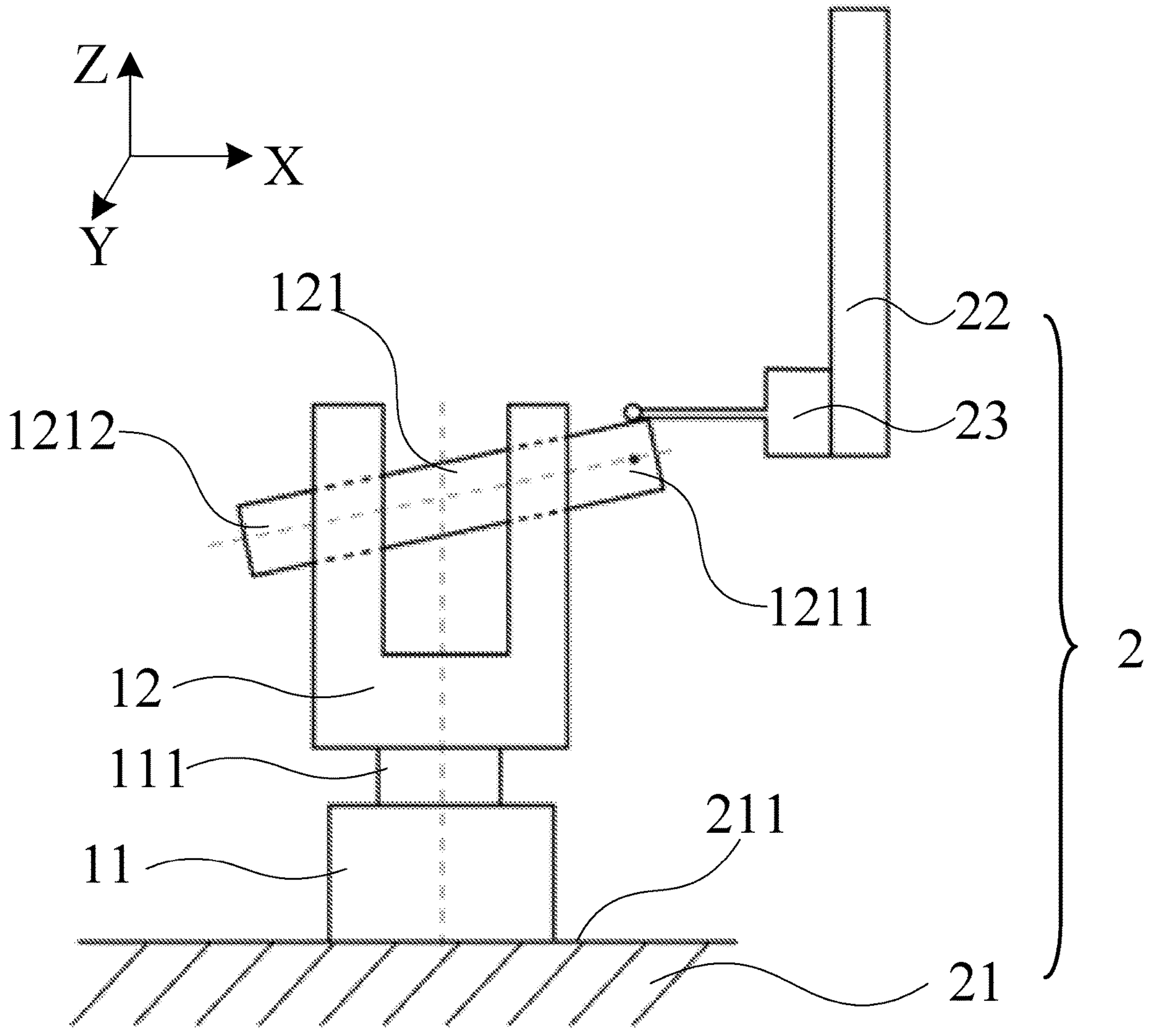
FIG. 5 shows the measurement of spatial coordinates of a geometric center of a first virtual cross section according to an embodiment of the disclosure.
Figure 6:
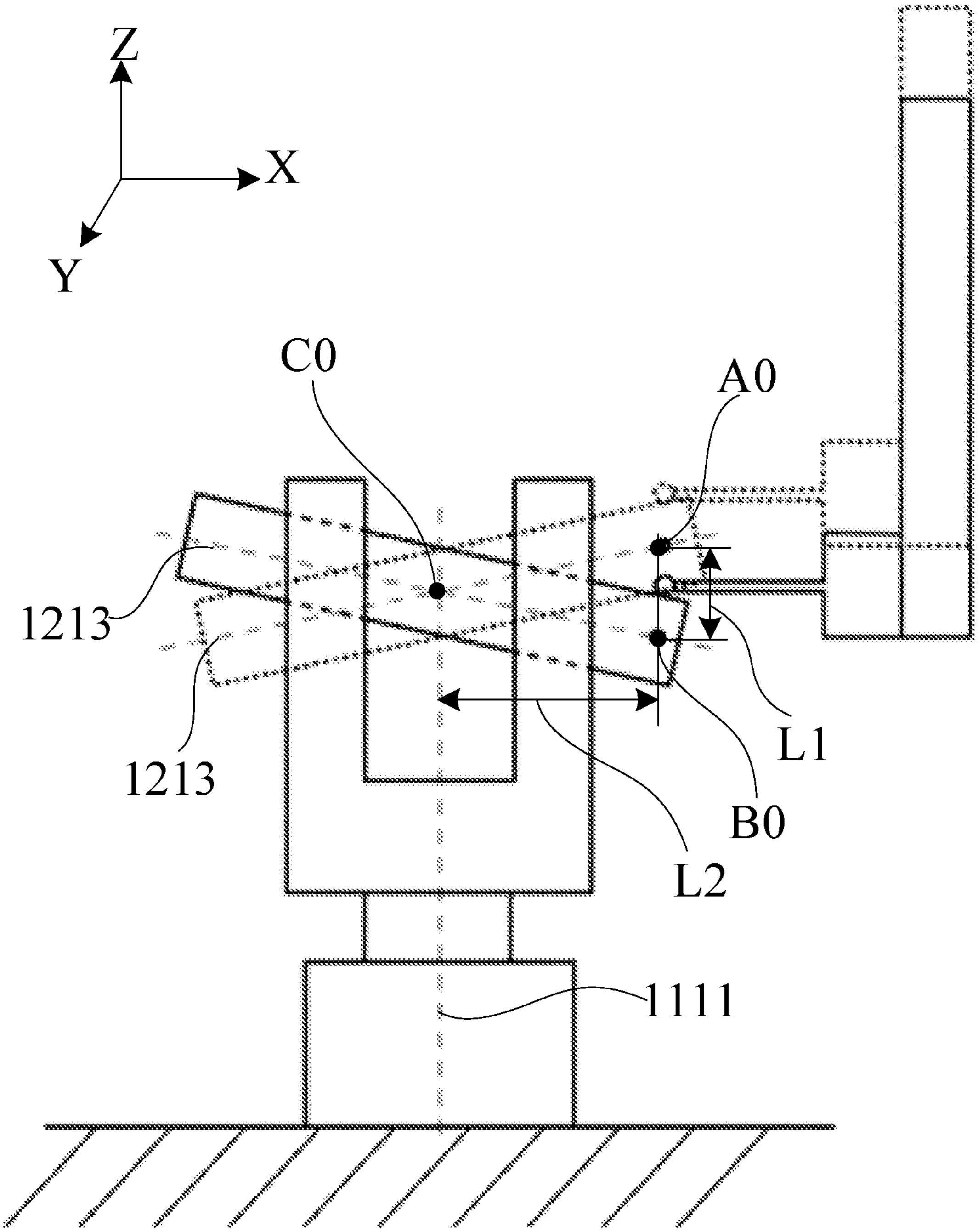
FIG. 6 shows the measurement of spatial coordinates of a geometric center of a second virtual cross section according to an embodiment of the disclosure.

FIG. 1 shows a coordinate measuring instrument 1 (hereinafter referred to simply as instrument 1) according to an embodiment of the disclosure. FIG. 2 shows an orthogonal axis system S without mounting a second rotary axis 121 according to an embodiment of the disclosure. FIG. 3 shows the orthogonal axis system S according to an embodiment of the disclosure. FIG. 4 is a flowchart showing a method for measuring the orthogonality of the orthogonal axis system S according to an embodiment of the disclosure. FIG. 5 shows the measurement of spatial coordinates of a geometric center of a first virtual cross section A according to an embodiment of the disclosure. FIG. 6 shows the measurement of spatial coordinates of a geometric center of a second virtual cross section B according to an embodiment of the disclosure.

In some examples, as shown in FIGS. 1 and 2, the instrument 1 may include a first rotary device 11 and a second rotary device 12. In some examples, as shown in FIG. 3, the orthogonal axis system S may include a first rotary axis 111 and the second rotary axis 121.

In some examples, the first rotary axis 111 may be mounted to the first rotary device 11 and the second rotary axis 121 may be mounted to the second rotary device 12. In some examples, the second rotary device 12 may be provided on the first rotary device 11 and rotatable around the first rotary device 11. In some examples, the second rotary device 12 may include at least two supporting portions. For example, referring to FIG. 2, the second rotary device 12 may include a first supporting portion 122 and a second supporting portion 123. In some examples, the first supporting portion 122 may be provided with a first through hole 124. In some examples, the second supporting portion 123 may be provided with a second through hole 125. The second rotary axis 121 may be mounted between the first supporting portion 122 and the second supporting portion 123 through the first through hole 124 and the second through hole 125. In some examples, as shown in FIG. 3, the second rotary axis 121 may include a first end 1211 and a second end 1212. In some examples, the first end 1211 and the second end 1212 may be located at two ends of the second rotary axis 121, respectively.

In some examples, the orthogonal axis system S may be formed by the first rotary axis 111 and the second rotary axis 121. In other examples, the orthogonal axis system S may include the first rotary axis 111 and the second rotary axis 121. In some examples, the first rotary axis 111 is substantially orthogonal to the second rotary axis 121 in the orthogonal axis system S. The orthogonal axis system S is particularly important for the measurement accuracy of the instrument 1, particularly in the case of the measuring instrument; for example, in the orthogonal axis system S, if a significant error occurs in the process of assembling the first rotary axis 111 and the second rotary axis 121, resulting in that the orthogonality of the orthogonal axis system S, for example, the orthogonality between the first rotary axis 111 and the second rotary axis 121, does not meet requirements, as a result, the measurement accuracy of the instrument 1 is not qualified.

In some examples, the orthogonality of the orthogonal axis system S may be measured using a measuring apparatus. In some examples, the measuring apparatus may include a measuring device 2 and a data processing device.

In some examples, the orthogonality of the orthogonal axis system S may be measured using the measuring device 2 as shown in FIG. 5. In some examples, the measuring device 2 may include a bearing platform 21, a bracket 22 mounted to the bearing platform 21, and a measuring meter 23 disposed on the bracket 22.

In some examples, the measuring meter 23 may be provided on the bracket 22, as described above. In some examples, the bracket 22 may have a moving mechanism (not shown) adjusting the position of the measuring meter 23. In some examples, the moving mechanism may be a slide rail or a movable mechanical arm. In some examples, the moving mechanism may control the measuring meter 23 to move in a vertical plane (e.g., a virtual cross section), for example, the moving mechanism may control the measuring meter 23 to make a circular motion, a vertical motion, a lateral motion, or a variety of irregular motions in the vertical plane.

Hereinafter, a method for measuring the orthogonality of the orthogonal axis system S in this embodiment will be described in detail with reference to FIGS. 5 and 6. Referring to FIG. 4, the method according to an embodiment of the disclosure may include: placing the instrument 1 (step S100), obtaining a first virtual cross section A (step S200), obtaining spatial coordinates of a first position A0 (step S300), enabling the first end 1211 and the second end 1212 to exchange positions (step S400), obtaining a second virtual cross section B (step S500), obtaining spatial coordinates of a second position B0 (step S600), and determining the orthogonality (step S700).

In the present disclosure, the orthogonality of the orthogonal axis system S of the instrument 1 may be measured using the method in this embodiment. According to the orthogonality measuring method in this embodiment, it may be able to simplify the steps of measuring and improve the accuracy of an orthogonality measurement result (also referred to as measurement result) of the orthogonal axis system S.

As described above, the method may include step S100. In some examples, in step S100, the method may include placing the instrument 1 of the orthogonal axis system S on the bearing surface 211.

As shown in FIG. 5, in some examples, the bearing surface 211 may belong to the bearing platform 21.

In some examples, the bearing surface 211 may be any flat surface, for example, having certain roughness or inclination. In some examples, marble may be used as the material of the bearing platform 21. In general, the marble has a fine composition and uniform texture, a smooth surface, and a small roughness, resulting in enabling a high manufacturing accuracy of a reference plane (e.g., the bearing surface 211), for example, the manufacturing accuracy may be controlled between 1 micron and 10 microns. Thereby, it may be facilitated to improve the accuracy of the measurement result.

In some examples, the bearing surface 211 may be a horizontal flat plane. In some examples, the flatness of the bearing surface 211 may be less than a first preset threshold value. In some examples, the first preset threshold value may be from 1 micron to 8 microns. For example, the first preset threshold may be 1 micron, 2 microns, 3 microns, 4 microns, 5 microns, 6 microns, 7 microns, or 8 microns, etc.

In some examples, a certain perpendicularity may be maintained between the first rotary axis 111 and the bearing surface 211. Thereby, the accuracy of the method may be improved. In some examples, the smaller the perpendicularity between the first rotary axis 111 and the bearing surface 211 is, the smaller the error in the measurement result will be.

In some examples, the perpendicularity between the first rotary axis 111 and the bearing surface 211 may be adjusted through machining and assembling to reduce errors in the measurement result. For example, the perpendicularity between the first rotary axis 111 and the bearing surface 211 may be enabled to be smaller than a second preset threshold value through machining and assembling. In general, the perpendicularity between the first rotary axis 111 and the bearing surface 211 may impact the measurement result. In this case, the influence of the errors in the measurement result may be reduced by controlling the perpendicularity between the first rotary axis 111 and the bearing surface 211.

In some examples, the second preset threshold value may be from 1 micron to 8 microns. For example, the second preset threshold value may be 1 micron, 2 microns, 3 microns, 4 microns, 5 microns, 6 microns, 7 microns, or 8 microns, etc.

In some examples, the measuring meter 23 may be placed above the bearing surface 211. In some examples, the measuring meter 23 may be fixed above the bearing platform 21 by the bracket 22. In some examples, the bracket 22 may be mounted on the bearing platform 21. However, the examples of the present disclosure are not limited to hereof, and the bracket 22 may be mounted at any position that enables the measuring meter 23 to be fixed above the bearing platform 21. In some examples, the measuring meter 23 may be used to obtain spatial coordinates of measurement points (e.g., the first measurement points a1 to a10, or the second measurement points b1 to b10).

In some examples, the measuring meter 23 for obtaining spatial coordinates may be a three-coordinate measuring meter. The three-coordinate measuring meter may be one having a detector movable in three directions.

In some examples, the measuring meter 23 may move on three guide rails (not shown) perpendicular to each other. In some examples, the measuring meter 23 may transmit signals in a contact or non-contact manner, etc. In some examples, the measuring meter 23 may use a tool such as a data processor or a computer to obtain spatial coordinates of a measured target object, for example the measurement point, on basis of displacement measurements along the three axes.

In some examples, a three-coordinate measuring meter may employ contact measurement. In other examples, the three-coordinate measuring meter may employ non-contact measurement. In this case, due to high accuracy and convenience of the measurement with the three-coordinate measuring meter, the measurement efficiency may be improved.

Figure 7:
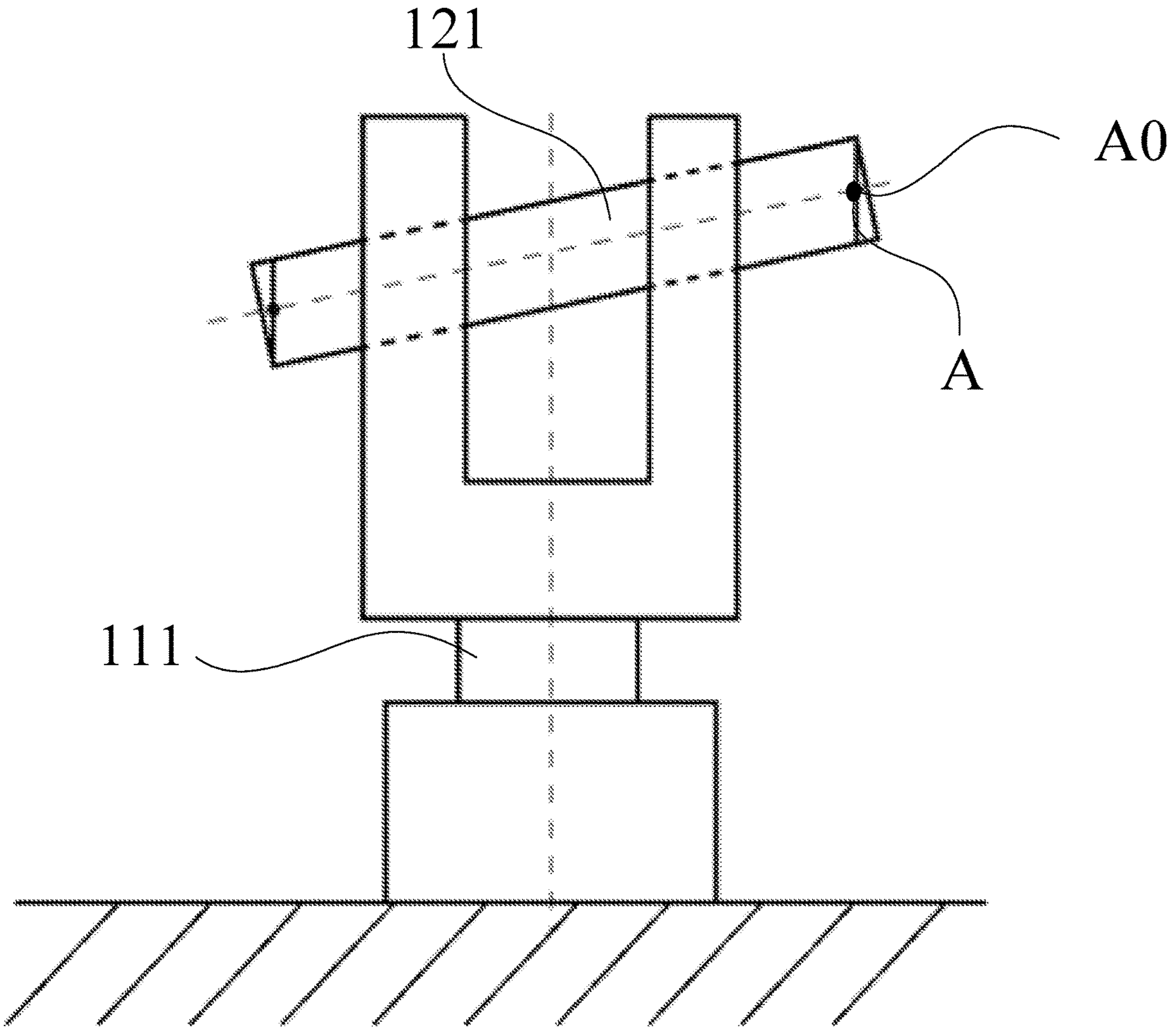
FIG. 7 shows a first virtual cross section intercepted via an interception plane according to an embodiment of the disclosure.
Figure 8:
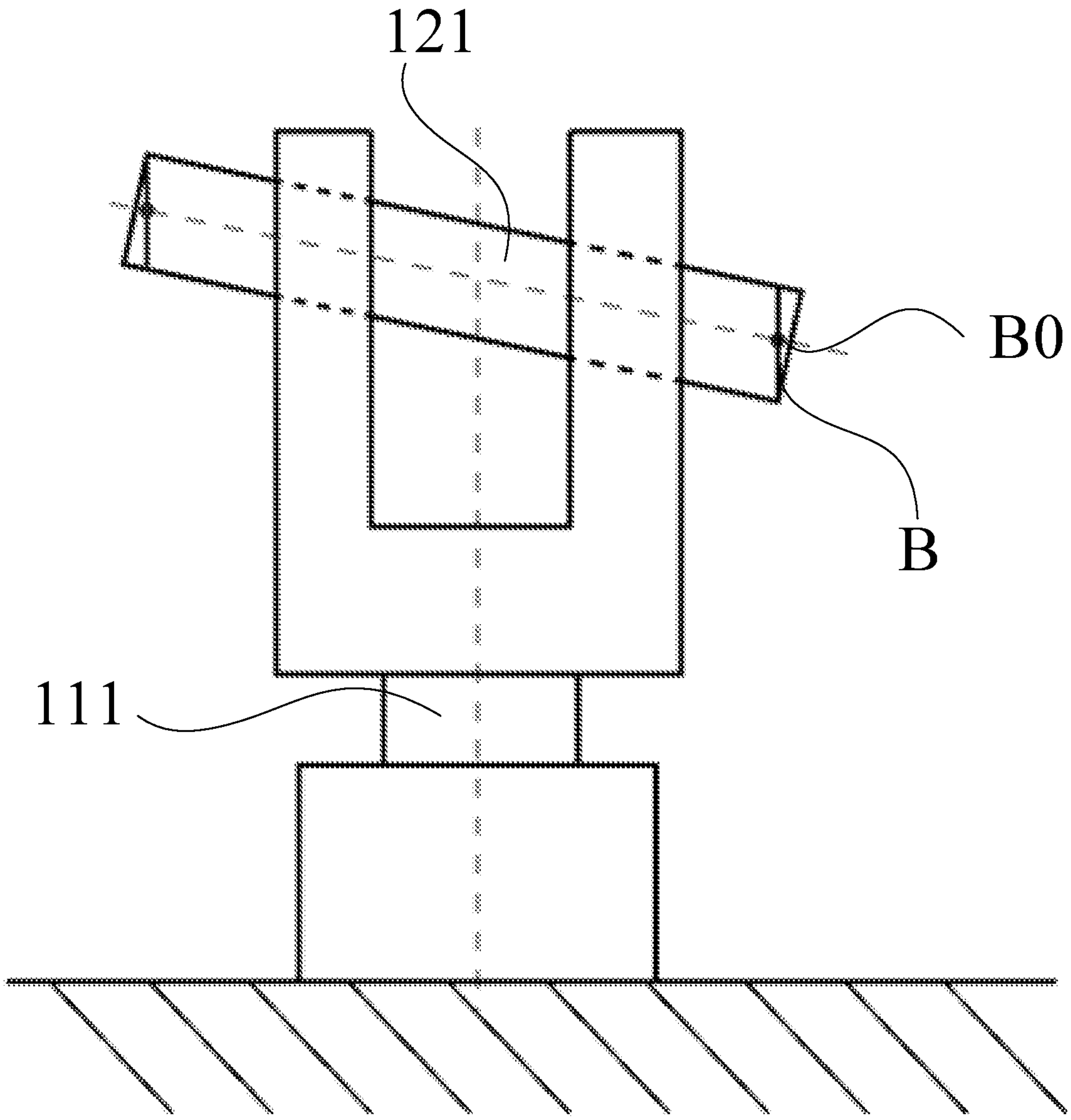
FIG. 8 shows a second virtual cross section intercepted via an interception plane according to an embodiment of the disclosure.
Figure 9A:
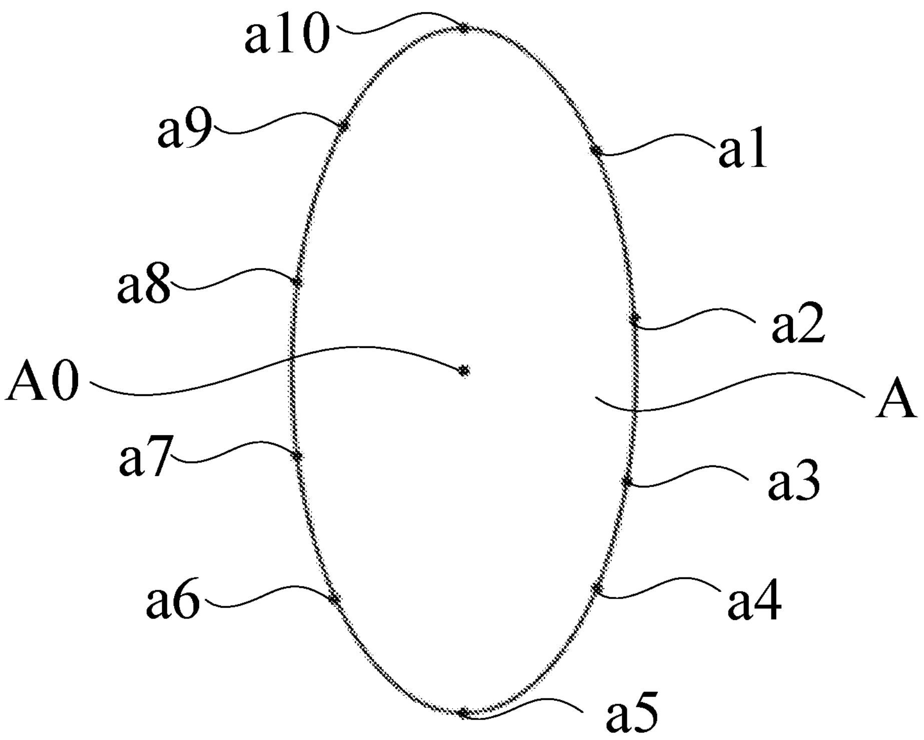
FIG. 9A shows the measurement of a first position according to an embodiment of the disclosure.
Figure 9B:
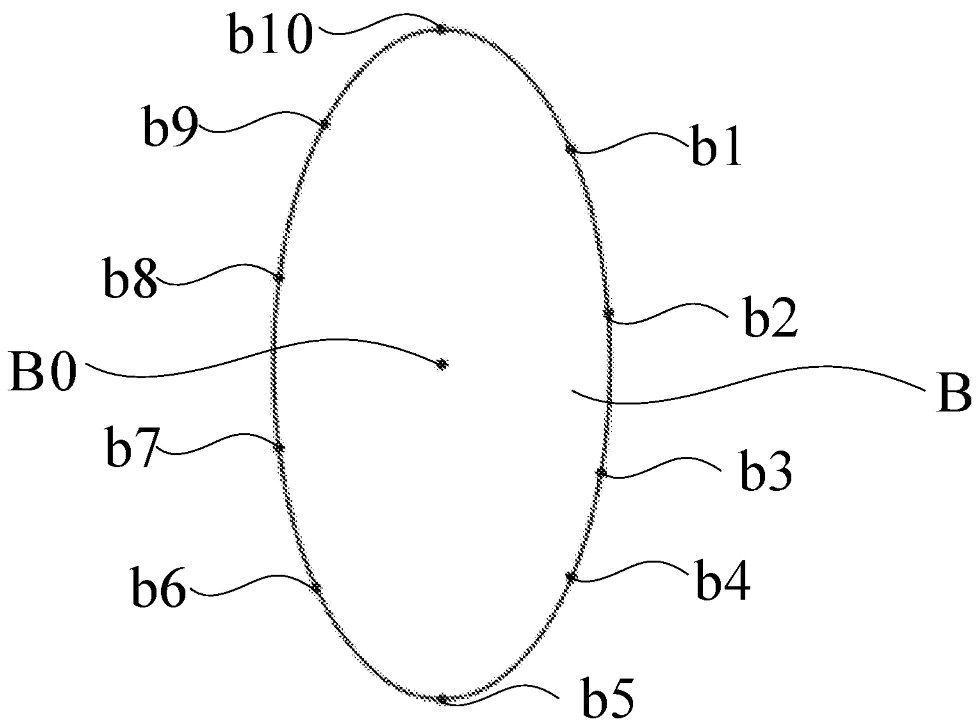
FIG. 9B shows the measurement of a second position according to an embodiment of the disclosure.

FIG. 7 shows a first virtual cross section A intercepted by an interception plane according to an embodiment of the disclosure. FIG. 8 shows a second virtual cross section B intercepted by an interception plane according to an embodiment of the disclosure. FIG. 9A shows the measurement of a first position A0 according to an embodiment of the disclosure. FIG. 9B shows the measurement of a second position B0 according to an embodiment of the disclosure.

As described above, the method may include step S200. In some examples, in step S200, the first virtual cross section A may be obtained. The first virtual cross section A may belong to the second rotary axis 121. In some examples, the second rotary axis 121 may be intercepted along the interception plane to obtain the first virtual cross section A.

In some examples, the interception plane may be orthogonal to the bearing surface 211 and a projection of the second rotary axis 121 on the bearing surface 211.

In some examples, the interception plane may pass through a specific point of the bearing surface 211 and be orthogonal to the bearing surface 211 and the projection of the second rotary axis 121 on the bearing surface 211.

In some examples, the interception plane may be a plane passing through the highest point of the first end 1211. In this case, it is facilitated for the measuring meter 23 to measure the spatial coordinates of a plurality of first measurement points on the outer periphery of the first virtual cross section A.

In some examples, as shown in FIGS. 5 and 6, the axial line of the first rotary axis 111 may be a first axial line 1111 and the axial line of the second rotary axis 121 may be a second axial line 1213. In some examples, the horizontal direction may be a direction to which an X-axis points, the vertical direction may be a direction to which a Z-axis points. The vertical direction may be a direction parallel to the first axial line 1111, and a Y-axis may be a direction orthogonal to the X-axis and the Z-axis. In some examples, the interception plane may be a plane parallel to the plane in which the Z-axis and the Y-axis lie and passing through a specific point of the bearing surface 211. In some examples, the specific point may be located within the projection of the second rotary axis 121 on the bearing surface 211. In this case, the first end 1211 of the second rotary axis 121 may be intercepted by the interception plane to obtain the first virtual cross section A.

In some examples, the first virtual cross section A may be elliptical or circular. In some examples, the shape of the second virtual cross section B (described later) may be consistent with the shape of the first virtual cross section A. That is, the first virtual cross section A and the second virtual cross section B are both elliptical, or the first virtual cross section A and the second virtual cross section B are both circular. Thereby, the first virtual cross section A and the second virtual cross section B may be obtained.

In some examples, if the first rotary axis 111 is not completely orthogonal to the second rotary axis 121, the first virtual cross section A intercepted by the interception plane is an ellipse. In some examples, if the first rotary axis 111 is completely orthogonal to the second rotary axis 121, the first virtual cross section A intercepted by the interception plane is a circle.

In some examples, the radial circular run-out of the second rotary axis 121 may be measured before obtaining the first virtual cross section A. In this case, it is able to reduce determination errors in subsequently obtaining the spatial coordinates of the geometric center of the first virtual cross section A and the spatial coordinates of the geometric center of the second virtual cross section B later. In general, the smaller the radial circular run-out is, the higher the accuracy of machining the second rotary axis 121 will be. In some examples, the radial circular run-out of the second rotary axis 121 may be measured by measuring the radial circular run-out of the first end 1211 and the second end 1212.

In some examples, the radial circular run-out of the second rotary axis 121 may be measured using a dial gauge. In some examples, the radial circular run-out of the second rotary axis 121 may include a first radial circular run-out and a second radial circular run-out. Specifically, a probe of the dial gauge may be brought into contact with the first end 1211, and then the second rotary axis 121 is rotated with the second axial line 1213 as a rotation center to enable the probe of the dial gauge to slide on an outer circumferential surface of the first end 1211 to measure the first radial circular run-out of the first end 1211; the probe of the dial gauge is brought into contact with the second end 1212, and the second rotary axis 121 is rotated with the second axial line 1213 as a rotation center to enable the probe of the dial gauge to slide on the outer circumferential surface of the second end 1212 to measure the second radial circular run-out of the second end 1212; if the first radial circular run-out or the second radial circular run-out is greater than the third preset threshold value, the second rotary axis 121 is machined to enable the first radial circular run-out and the second radial circular run-out to be not greater than the third preset threshold.

In some examples, the third preset threshold value may be from 1 micron to 8 microns. For example, the third preset threshold value may be 1 micron, 2 microns, 3 microns, 4 microns, 5 microns, 6 microns, 7 microns, or 8 microns, etc.

In this case, the high accuracy of machining the second rotary axis 121 may reduce determination errors in subsequently acquiring the spatial coordinates of the geometric center of the first virtual cross section A and the spatial coordinates of the geometric center of the second virtual cross section B later.

As described above, the method may include step S300. In some examples, in step S300, the spatial coordinates of the first position A0 may be obtained.

In some examples, in step S300, the first virtual cross section A may be measured to obtain the first position A0. In some examples, the first position A0 may be the geometric center of the first virtual cross section A (that is, the geometric center of the first virtual cross section A may be taken as the first position A0).

In some examples, the first position A0 may be obtained by measuring the spatial coordinates of the plurality of first measurement points and based on the spatial coordinates of the plurality of first measurement points as a basis. In this case, the spatial coordinates of the geometric center (i.e., the first position A0) of the first virtual cross section may be calculated through the plurality of first measurement points In some examples, the plurality of first measurement points may be located at the outer periphery of the first virtual cross section A. In some examples, a probe of the measuring meter 23 may be enabled to rotate around the outer periphery of the first virtual cross section A on the interception plane to acquire the spatial coordinates of the plurality of first measurement points. In some examples, the probe of the measuring meter 23 may be rotated half a circle around the outer periphery of the first virtual cross section A on the interception plane. Thereby, the spatial coordinates of the plurality of first measurement points may be obtained. In some examples, the probe of the measuring meter 23 may rotate at least one circle around the outer periphery of the first virtual cross section A on the interception plane. In this case, the spatial coordinates of the plurality of first measurement points may be uniformly measured on the outer periphery of the first virtual cross section A.

In some examples, a movement speed of the probe of the measuring meter 23 around the first virtual cross section A on the interception plane may be from 5 mm/s to 10 mm/s. For example, the movement speed of the measuring meter 23 may be 5 mm/s, 6 mm/s, 7 mm/s, 8 mm/s, 9 mm/s or 10 mm/s, etc. In this case, the above-mentioned probe may be enabled to run stably on the interception plane to obtain accurate spatial coordinates of the first measurement points.

In some examples, the second rotary axis 121 of the orthogonal axis system S may be enabled to reach a direction substantially parallel to the probe of the measuring meter 23 through rotating the first rotary axis 111. In this case, it is facilitated for the measuring meter 23 to quickly detect a measurement target (e.g., the first end 1211 or the second end 1212) and to measure the measurement target object.

In some examples, the measuring meter 23 may be stationary in the horizontal direction (X-axis direction) throughout the measurement. In this case, it is able to keep the rotation of the probe of the measuring meter 23 always on the first virtual cross section A.

In some examples, the number of the first measurement points may be not less than 5, (that is, the coordinates of the geometric center of an ellipse may be determined through the spatial coordinates of at least 5 points). For example, the number of the first measurement points may be 5, 6, 7, 8, 9, 10, 20, or 50, etc. Optionally, the number of the first measurement points may be from 8 to 10. In this case, sufficient first measurement points may be obtained for obtaining the spatial coordinates of the geometric center of the first virtual cross section A (i.e., the first position A0), and determination errors of the spatial coordinates may be reduced.

In some examples, the plurality of first measurement points may be uniformly distributed on the outer periphery of the first virtual cross section A. As an example, the number of the first measurement points may be 10, as shown in FIG. 9A, the first virtual cross section A may be an ellipse, and the 10 first measurement points may include a first measurement point a1, a first measurement point a2, a first measurement point a3, a first measurement point a4, a first measurement point a5, a first measurement point a6, a first measurement point a7, a first measurement point a8, a first measurement point a9, and a first measurement point a10.

In some examples, the spatial coordinates of the plurality of first measurement points may be pre-processed, for example, the spatial coordinates of outliers in the plurality of first measurement points may be removed. In this case, it is able to reduce determination errors in the spatial coordinates of the geometric center (i.e., the first position A0) of the first virtual cross section A due to a measurement failure.

However, the examples of the present disclosure are not limited to this, in some examples, the first position A0 may be any position on the first virtual cross section A. The any position may be obtained based on the plurality of first measurement points.

As mentioned above, a measurement system may include a data processing device. In some examples, the measurement system may also include a data transmission unit. In some examples, the spatial coordinates of the plurality of first measurement points measured by the measuring meter 23 may be transmitted to the data processing device via the data transmission unit. The data processing device may perform a calculation based on the spatial coordinates of the plurality of first measurement points to obtain the spatial coordinates of the first position A0.

As described above, the measuring method may include step S400. In some examples, in step S400, the first end 1211 and the second end 1212 may be enabled to exchange the positions.

In some examples, in step S400, the second rotary axis 121 may be enabled to rotate with a preset angular degree by rotating the second rotary device 12. In some examples, the second rotary device 12 may be enabled to rotate by rotating the first rotary axis 111. In other examples, the second rotary device 12 may be enabled to rotate by rotating the first rotary device 11.

In some examples, the preset angular degree may be an odd multiple of 180°. In this case, the first end 1211 and the second end 1212 of the second rotary axis 121 may be enabled to exchange the positions. That is, the first end 1211 and the second end 1212 of the second rotary axis 121 may be enabled to exchange the positions by rotating the second rotary device 12.

In some examples, the measuring meter 23 may be stationary in the horizontal direction (X-axis direction) throughout the measurement. In this case, after the rotation of the second rotary axis 121, it is able to keep the rotation of the probe of the measuring meter 23 always on the second virtual cross section B, and it is able to make a horizontal distance from the first axial line 1111 of the first rotary axis 111 to the first virtual cross section A to be the same as a horizontal distance to the second virtual cross section B. It should be noted that that although the first virtual cross section A and the second virtual cross section B are two different cross sections, they are both located within the interception plane.

As described above, in some examples, the preset angular degree may be an odd multiple of 180°. In some examples, Optionally, the preset angular degree may be 180°. In this case, the first rotary axis 111 may be rotated with 180° to enable the first end 1211 and the second end 1212 of the second rotary axis 121 to exchange positions. Thereby, the spatial coordinates of the plurality of second measurement points on the outer periphery of the second virtual cross section B at the second end 1212 may be measured.

In other examples, the first rotary axis 111 may be rotated with 540°, 900°, . . . . That is, the first rotary axis 111 may be rotated with an odd multiple of 180°. In other words, the first rotary axis 111 may be rotated with (2k+1)×180°, where k may be a natural integer. In this case, the first end 1211 and the second end 1212 of the second rotary axis 121 may be enabled to exchange positions.

In some examples, the instrument 1 may have a driving mechanism (not shown). In some examples, the first rotary axis 111 may be driven by the driving mechanism to rotate the first rotary axis 111. In some examples, the first rotary axis 111 may freely rotate by taking the first axial line 1111 as a center of rotation. In some examples, the first rotary device 11 may be driven by the driving mechanism to enable the first rotary device 11 to rotate. In other examples, the first rotary axis 111 may be driven by the driving mechanism to enable the first rotary device 11 to rotate, or the first rotary device 11 may be driven by the driving mechanism to enable the first rotary axis 111 to rotate.

In some examples, the driving mechanism may be servo controlled by a motor and an encoder, and the servo control features high positioning accuracy and quick response. In this case, accurate and quick positioning of the first rotary axis 111 may be realized, and the accuracy of positioning the first rotary axis 111 may be as high as, for example, 1 to 5 arc sec. Thereby, it is able to effectively reduce the error caused by the inaccurate positioning of the first rotary axis 111 during the rotation.

As described above, the measuring method may include step S500. In some examples, in step S500, the second virtual section B may be obtained. The second virtual cross section B may belong to the second rotary axis 121. In some examples, as shown in FIG. 8, the second rotary axis 121 may be intercepted along the interception plane to obtain the second virtual cross section B.

In some examples, the interception plane may be orthogonal to the bearing surface 211 and the projection of the second rotary axis 121 on the bearing surface 211.

In some examples, the interception plane may pass through the specific point of the bearing surface 211 and be orthogonal to the bearing surface 211 and the projection of the second rotary axis 121 on the bearing surface 211.

In some examples, the interception plane may be a plane passing through the highest point of the second end 1212. In this case, it is facilitated for the measuring meter 23 to measure the spatial coordinates of the plurality of second measurement points on the outer periphery of the second virtual cross section B.

In some examples, the interception plane may be a plane parallel to a plane in which the Z and Y axes lie and pass through a specific point of the bearing surface 211. In some examples, the specific point may be located within the projection described above. In this case, the interception plane may be enabled to intercept the second end 1212 of the second rotary axis 121 to obtain the second virtual cross section B.

In some examples, the second virtual cross section B may be elliptical or circular. In some examples, if the first rotary axis 111 and the second rotary axis 121 are not completely orthogonal, the second virtual cross section B intercepted by the interception plane is an ellipse. In some examples, if the first rotary axis 111 is completely orthogonal to the second rotary axis 121, the second virtual cross section B intercepted by the interception plane is a circle.

In some examples, in step S600, the second virtual section B may be measured to obtain the second position B0. In some examples, the second location B0 may be the geometric center of the second virtual cross section B (that is, the geometric center of the second virtual cross section B may be taken as the second location B0).

In some examples, the second location B0 may be obtained by measuring the spatial coordinates of the plurality of second measurement points and based on the spatial coordinates of the plurality of second measurement points. In this case, the spatial coordinates of the geometric center (i.e., the second position B0) of the second virtual cross section B may be calculated through the plurality of second measurement points.

In some examples, the plurality of second measurement points may be located on the outer periphery of the second virtual section B. In some examples, the probe of the measuring meter 23 may be enabled to rotate around the outer periphery of the second virtual cross section B on the interception plane to acquire the spatial coordinates of the plurality of second measurement points. In some examples, the probe of the measuring meter 23 may rotate at least one circle around the outer periphery of the second virtual cross section B on the interception plane. In this case, the spatial coordinates of the plurality of second measurement points may be uniformly measured on the outer periphery of the second virtual cross section B.

In some examples, the movement speed of the probe of the measuring meter 23 around the second virtual cross section B on the interception plane may be from 5 mm/s to 10 mm/s. For example, the movement speed of the measuring meter 23 may be 5 mm/s, 6 mm/s, 7 mm/s, 8 mm/s, 9 mm/s, or 10 mm/s, etc. In this case, the probe may be enabled to run stably on the interception plane to obtain accurate spatial coordinates of the second measurement points.

In some examples, the measuring meter 23 may be stationary in the horizontal direction throughout the measurement. In this case, it is able to keep the rotation of the probe of the measuring meter 23 always on the second virtual cross section B.

In some examples, the number of the second measurement points may be not less than 5 (that is, the coordinates of the geometric center of an ellipse may be determined through the spatial coordinates of at least 5 points). For example, the number of the second measurement points may be 5, 6, 7, 8, 9, 10, 20, or 50, etc. Optionally, the number of the second measurement points may be from 8 to 10. In this case, sufficient second measurement points may be obtained for acquiring the spatial coordinates of the geometric center of the second virtual cross section B (i.e., the second position B0), and determination errors of the spatial coordinates may be reduced.

In some examples, the plurality of second measurement points may be uniformly distributed on the outer periphery of the second virtual cross section B. As an example, the number of the second measurement points may be 10, as shown in FIG. 9B, the second virtual cross section B may be an ellipse, and the 10 second measurement points may include a second measurement point b1, a second measurement point b2, a second measurement point b3, a second measurement point b4, a second measurement point b5, a second measurement point b6, a second measurement point b7, a second measurement point b8, a second measurement point b9, and a second measurement point b10.

In some examples, the spatial coordinates of the plurality of second measurement points may be pre-processed, for example, the spatial coordinates of outliers in the plurality of second measurement points may be removed. In this case, it is able to reduce determination errors in the spatial coordinates of the geometric center (i.e., the second position B0) of the second virtual cross section B due to a measurement failure.

In some examples, the second position B0 may also be located at any position on the second virtual cross section B. The any position may be obtained based on the plurality of second measurement points. It should be noted that the first position A0 and the second position B0 need to correspond to each other, for example, if the first position A0 is the geometric center of the first virtual plane A, then the second position B0 should be the geometric center of the second virtual cross section B.

As mentioned above, the spatial coordinates of the plurality of second measurement points may be transmitted to the data processing device via the data transmission unit. The data processing device may perform a calculation based on the spatial coordinates of the plurality of second measurement points to obtain the spatial coordinates of the second position B0.

As described above, the measuring method may include step S700. In some examples, in step S700, the orthogonality may be determined.

In some examples, in step S700, whether the orthogonality between the first rotary axis 111 and the second rotary axis 121 meets requirements may be determined based on the first position A0 and the second position B0.

In some examples, whether the orthogonality of the orthogonal axis system S meets requirements may be determined based on the first position A0 and the second position B0.

In some examples, the data processing device may determine whether the orthogonality meets requirements based on the first position A0 and the second location B0. In some examples, whether the orthogonality meets requirements may be determined by a human based on the first position A0 and the second location B0.

As shown in FIG. 6, in some examples, a distance between the first position A0 and the second position B0 may be taken as a first distance L1, and whether the orthogonality between the first rotary axis 111 and the second rotary axis 121 meets requirements may be determined based on the first distance L1. In this case, it is able to determine whether the orthogonality of the orthogonal axis system S of the instrument 1 meets requirements based on the first distance L1.

In some examples, if the first distance L1 is less than a preset value, a determination may be made that the orthogonality between the first rotary axis 111 and the second rotary axis 121 meets requirements. In some examples, if the first distance L1 is not less than the preset value, a determination may be made that the orthogonality between the first rotary axis 111 and the second rotary axis 121 doses not meet requirements. In some examples, the preset value may be related to the specific point (i.e., the specific point in step S200). In some examples, the closer the specific point is to the first axial line 1111 in the horizontal direction (X-axis direction), the smaller the preset value will be; and the farther the specific point is to the first axial line 1111 in the horizontal direction (X-axis direction), the larger the preset value will be. In this case, it is able to determine whether the orthogonality of the orthogonal axis system S of the instrument 1 meets requirements based on the first distance L1 and the preset value.

In some examples, the preset value may also be related to the size of the orthogonal axis system S. Specifically, the larger the size of the first rotary axis 111 or the second rotary axis 121 is the larger the preset value is.

In some examples, as shown in FIG. 6, the spatial coordinates of the arbitrary point on the first axial line 1111 may be taken as a third position C0, a distance from the third position C0 to the interception plane may be taken as a second distance L2, and a mismatch angle may be obtained based on the first distance L1 and the second distance L2. In some examples, as shown in FIG. 6, the mismatch angle may be an angle between the second axial line 1213 of the second rotary axis 121 (the axial line of the second rotary axis 121 shown in dotted lines) and the second axial line 1213 of the second rotary axis 121 after a 180° rotation (the axial line of the second rotary axis 121 shown in solid lines). In this case, the mismatch angle between the first rotary axis 111 and the second rotary axis 121 may be obtained according to a trigonometric relationship.

In some examples, the spatial coordinates of the third position C0 may be measured by the measuring meter 23. In some examples, the measuring meter 23 may obtain and determine the spatial coordinates of a plurality of points on the outer periphery of the first rotary axis 111 on a plane parallel to the bearing surface 211. In this case, the spatial coordinates of the third position C0 may be calculated based on the spatial coordinates of the plurality of points.

In some examples, a distance in the X-axis direction between the first position A0 and the third position C0 may be taken as a distance from the third position C0 to the interception plane, i.e., the second distance L2. In this case, the second distance L2 may be calculated based on the spatial coordinates of the first position A0 and the spatial coordinates of the third position C0. In some examples, a distance in the X-axis direction from the third position C0 to the second position B0 may be taken as the distance from the third position C0 to the interception plane, i.e., the second distance L2. In this case, the second distance L2 may be calculated based on the spatial coordinates of the first position A0 and the spatial coordinates of the third position C0.

In some examples, the mismatch angle between the first rotary axis 111 and the second rotary axis 121 may be obtained according to the following formula, and the mismatch angle may be expressed as:

$$\delta = 2\times\arctan\frac{L1}{2L2}$$

Here, δ is the mismatch angle between the first rotary axis 111 and the second rotary axis 121, L1 is the first distance, and L2 is the second distance. Thereby, the mismatch angle between the first rotary axis 111 and the second rotary axis 121 may be directly calculated through the formula, and the mismatch angle between the first rotary axis 111 and the second rotary axis 121 may serve as the basis for determining whether the orthogonality of the orthogonal axis system S of the instrument 1 meets requirements.

In some examples, if the mismatch angle is less than a preset angle, a determination may be made that the orthogonality between the first rotary axis 111 and the second rotary axis 121 meets requirements, if the mismatch angle is not less than the preset angle, a determination may be made that the orthogonality between the first rotary axis 111 and the second rotary axis 121 does not meet requirements. In this case, it is able to determine whether the orthogonality of the orthogonal axis system S of the instrument 1 meets requirements based on the calculated mismatch angle. In some examples, the preset angle may be from 0 arc sec to 15 arc sec.

The present disclosure also discloses a measuring device 2 for the orthogonality of the orthogonal axis system S, hereinafter referred to simply as measuring device 2. In some examples, the measuring device 2 may be used to measure the orthogonality of the orthogonal axis system S of the instrument 23. In some examples, the measuring device 2 may include the bearing platform 21 used for placing the orthogonal axis system S, the moving mechanism, and the measuring meter 23 provided on the moving mechanism.

In some examples, the measuring meter 23 may be configured to measure the first virtual cross section A to obtain the first position A0, and measure the second virtual cross section B to obtain the second position B0 after the second rotary axis 121 is rotated by the preset angular degree. Specifically, in some examples, the measuring meter 23 may be configured to measure the spatial coordinates of the plurality of first measurement points located at the edge of the first virtual cross section A and the spatial coordinates of the plurality of second measurement points located at the edge of the second virtual cross section B. In some examples, the first position A0 may be obtained based on the spatial coordinates of the plurality of first measurement points, and the second location B0 may be obtained based on the spatial coordinates of the plurality of second measurement points.

In some examples, the first position A0 may be any position located on the first virtual cross section A, and the second position B0 may be any position located on the second virtual cross section B. Optionally, the first position A0 may be the geometric center of the first virtual cross section A, and the second position B0 may be the geometric center of the second virtual cross section B.

In some examples, the second rotary axis 121 may be intercepted along the interception plane to obtain the first virtual cross section A, and the second rotary axis 121 is intercepted along the interception plane to obtain the second virtual cross section B after the second rotary axis 121 is rotated with the preset angular degree. In some examples, the interception plane may be orthogonal to the bearing surface 211 and the projection of the second rotary axis 121 on the bearing surface 211.

In some examples, the moving mechanism is configured to control the measuring meter 23 to move within the first virtual section A and the second virtual section B, for example, to do a circular motion, a vertical motion, or a lateral motion.

In some examples, the measuring device 2 may further include the data processing device, and the data processing device may calculate the first position A0 and the second position B0 and determine the orthogonality of the orthogonal axis system S based on the first position A0 and the second position B0.

In some examples, the disclosure may provide a method with improved accuracy for measuring the orthogonality of an orthogonal axis system.

In some examples, according to the measuring method of this embodiment, by measuring the spatial coordinates of the plurality of first measurement points (a1 to a10) and the plurality of second measurement points (b1 to b10), it may be able to effectively reduce determination errors in the spatial coordinates of the geometric center of the first virtual cross section A (i.e., the first position A0) and the spatial coordinates of the geometric center of the second virtual cross section B (i.e., the second position B0), which may help to improve the accuracy of the measurement result of the orthogonality of the orthogonal axis system S and may further improve the measurement accuracy of the instrument 1.

While the present disclosure has been particularly shown and described with reference to the accompanying drawings and examples, it is to be understood that the present disclosure is not limited in any manner by the foregoing description. It will be apparent to those skilled in the art that various modifications and variations may be made to the present disclosure without departing from the spirit or scope of the present disclosure.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various FIGURES need be carried out in the specific order described.

What is claimed is:

1. A method for measuring orthogonality of an orthogonal axis system of an instrument, comprising:

placing the instrument on a bearing surface, flatness of the bearing surface being less than a first preset threshold;

making perpendicularity between a first rotary axis and the bearing surface smaller than a second preset threshold value;

intercepting a second rotary axis along an interception plane to obtain a first virtual cross section of the second rotary axis, the interception plane passing through a specific point of the bearing surface and being orthogonal to the bearing surface and a projection of the second rotary axis on the bearing surface, and measuring the first virtual cross section to obtain a geometric center of the first virtual cross section as a first position;

rotating a second rotary device to enable the second rotary axis to rotate with a preset angular degree, the preset angular degree being an odd multiple of 180°, using the interception plane to intercept the second rotary axis to obtain a second virtual cross section of the second rotary axis, and measuring the second virtual cross section to obtain a geometric center of the second virtual cross section as a second position; and determining whether the orthogonality between the first rotary axis and the second rotary axis meets requirements based on the first position and the second position;

wherein:

spatial coordinates of an arbitrary point on an axial line of the first rotary axis are obtained as a third position;

a distance between the first position and the second position is set as a first distance;

a distance from the third position to the interception plane is set as a second distance;

a mismatch angle is obtained based on the first distance and the second distance;

if the mismatch angle is less than a preset angle, the orthogonality between the first rotary axis and the second rotary axis meets requirements; and if the mismatch angle is not less than the preset angle, the orthogonality between the first rotary axis and the second rotary axis does not meet requirements; and wherein:

the instrument comprises a first rotary device having the first rotary axis and the second rotary device having the second rotary axis;

the second rotary device is provided on the first rotary device and is rotatable around the first rotary device; and the orthogonal axis system is formed by the first rotary axis and the second rotary axis.

2. The method according to claim 1, wherein:

the first position is obtained by measuring spatial coordinates of a plurality of first measurement points located at an edge of the first virtual cross section and based on the spatial coordinates of the plurality of first measurement points; and the second position is obtained by measuring spatial coordinates of a plurality of second measurement points located at an edge of the second virtual cross section and based on the spatial coordinates of the plurality of second measurement points.

3. The method according to claim 2, wherein:

the plurality of first measurement points are located at an outer periphery of the first virtual cross section;

the plurality of second measurement points are located at the outer periphery of the second virtual cross section;

a number of the plurality of first measurement points is not less than 5; and a number of the plurality of second measurement points is not less than 5.

4. The method according to claim 1, wherein:

a distance between the first position and the second position is set as a first distance; and the first distance determines whether the orthogonality between the first rotary axis and the second rotary axis meets requirements.

5. The method according to claim 4, wherein:

if the first distance is less than a preset value, the orthogonality between the first rotary axis and the second rotary axis meets requirements;

if the first distance is not less than the preset value, the orthogonality between the first rotary axis and the second rotary axis does not meet requirements; and the preset value is related to the specific point.

6. The method according to claim 1, wherein the first virtual cross section and the second virtual cross section are both elliptical, or the first virtual cross section and the second virtual cross section are both circular.

7. The method according to claim 1, wherein a radial circular run-out of the second rotary axis is measured before obtaining the first virtual cross section.

8. The method according to claim 7, wherein, if the radial circular run-out is greater than a third preset threshold value, the second rotary axis is machined to enable the radial circular run-out of the second rotary axis to be not greater than the third preset threshold value.

9. The method according to claim 1, wherein the specific point is located within the projection.

10. A method for measuring orthogonality of an orthogonal axis system of an instrument, comprising:

placing the instrument on a bearing surface, flatness of the bearing surface being less than a first preset threshold;

making perpendicularity between a first rotary axis and the bearing surface smaller than a second preset threshold value;

intercepting a second rotary axis along an interception plane to obtain a first virtual cross section of the second rotary axis, the interception plane passing through a specific point of the bearing surface and being orthogonal to the bearing surface and a projection of the second rotary axis on the bearing surface, and measuring the first virtual cross section to obtain a geometric center of the first virtual cross section as a first position;

rotating a second rotary device to enable the second rotary axis to rotate with a preset angular degree, the preset angular degree being an odd multiple of 180°, using the interception plane to intercept the second rotary axis to obtain a second virtual cross section of the second rotary axis, and measuring the second virtual cross section to obtain a geometric center of the second virtual cross section as a second position; and determining whether the orthogonality between the first rotary axis and the second rotary axis meets requirements based on the first position and the second position;

wherein:

a radial circular run-out of the second rotary axis is measured before obtaining the first virtual cross section;

if the radial circular run-out is greater than a third preset threshold value, the second rotary axis is machined to enable the radial circular run-out of the second rotary axis to be not greater than the third preset threshold value; and wherein:

the instrument comprises a first rotary device having the first rotary axis and the second rotary device having the second rotary axis;

the second rotary device is provided on the first rotary device and is rotatable around the first rotary device; and the orthogonal axis system is formed by the first rotary axis and the second rotary axis.

* * * * *